United States Patent
Aslam et al.

(10) Patent No.: US 9,547,592 B2
(45) Date of Patent: *Jan. 17, 2017

(54) CACHE MOBILITY

(71) Applicant: International Business Machines Corporation, Armonk, NY (US)

(72) Inventors: Muhammad Sohaib Aslam, Ajax (CA); Steven Langridge, Markham (CA); Tiia Salo, Cary, SC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 153 days.

This patent is subject to a terminal disclaimer.

(21) Appl. No.: 14/445,907

(22) Filed: Jul. 29, 2014

(65) Prior Publication Data

US 2016/0034303 A1 Feb. 4, 2016

(51) Int. Cl.
*G06F 12/08* (2016.01)
*G06F 9/455* (2006.01)
*G06F 15/173* (2006.01)

(52) U.S. Cl.
CPC ....... *G06F 12/0806* (2013.01); *G06F 12/0868* (2013.01); *G06F 12/0813* (2013.01); *G06F 12/0815* (2013.01); *G06F 15/17331* (2013.01); *G06F 2009/4557* (2013.01); *G06F 2212/1021* (2013.01); *G06F 2212/151* (2013.01); *G06F 2212/152* (2013.01); *G06F 2212/154* (2013.01); *G06F 2212/284* (2013.01); *G06F 2212/621* (2013.01)

(58) Field of Classification Search
CPC .............................................. G06F 2009/4557
See application file for complete search history.

(56) References Cited

U.S. PATENT DOCUMENTS

| | | | |
|---|---|---|---|
| 8,473,557 B2 | 6/2013 | Ramakrishnan et al. | |
| 8,930,947 B1* | 1/2015 | Derbeko | G06F 9/45558 711/113 |
| 9,003,104 B2* | 4/2015 | Joshi | G06F 12/0866 711/100 |
| 9,158,578 B1* | 10/2015 | Derbeko | G06F 12/08 |
| 9,274,838 B2* | 3/2016 | Bairavasundaram | G06F 9/5016 |

(Continued)

OTHER PUBLICATIONS

Bhavesh Davda. "Ultra-Low Latency on vSphere with RDMA." Aug. 2012. VMware. http://blogs.vmware.com/cto/files/2012/09/RDMAonvSphere.pdf.*

(Continued)

*Primary Examiner* — Nathan Sadler
(74) *Attorney, Agent, or Firm* — Cantor Colburn LLP; Rahan Uddin (57) ABSTRACT

A method and system of selecting and migrating relevant data from among data associated with a workload of a virtual machine and stored in source storage cache memory in a dynamic computing environment is described. The method includes selecting one or more policies, the one or more policies including a size policy defining a default maximum size for the relevant data. The method also includes selecting the relevant data from among the data based on the one or more policies in a default mode, and migrating the relevant data from the source storage cache memory to target storage cache memory.

8 Claims, 5 Drawing Sheets

(56) References Cited

U.S. PATENT DOCUMENTS

| | | | | |
|---|---|---|---|---|
| 2011/0148895 A1* | 6/2011 | Burckart | ............ | G06F 9/45558 345/557 |
| 2012/0159480 A1* | 6/2012 | Matsuzawa | ......... | G06F 9/45558 718/1 |
| 2013/0198459 A1* | 8/2013 | Joshi | .................... | G06F 12/084 711/130 |
| 2013/0311725 A1 | 11/2013 | Greenhalgh | | |
| 2014/0012940 A1 | 1/2014 | Joshi et al. | | |
| 2014/0013059 A1 | 1/2014 | Joshi et al. | | |
| 2014/0059292 A1* | 2/2014 | Phelan | ................ | G06F 12/0866 711/113 |
| 2014/0068183 A1* | 3/2014 | Joshi | .................. | G06F 12/0866 711/114 |
| 2014/0096139 A1* | 4/2014 | Alshinnawi | .......... | G06F 11/008 718/103 |
| 2014/0281131 A1* | 9/2014 | Joshi | .................. | G06F 12/0804 711/103 |
| 2015/0149730 A1* | 5/2015 | Hu | ....................... | G06F 3/0613 711/136 |
| 2015/0229717 A1* | 8/2015 | Gupta | ................. | H04L 67/1095 718/1 |
| 2015/0378921 A1* | 12/2015 | Karippara | ........... | G06F 9/45533 710/308 |

OTHER PUBLICATIONS

"What's New in VMware vSphere Flash Read Cache." Sep. 2013. VMware. https://www.vmware.com/files/pdf/vSphere_55_Flash_Read_Cache_Whats_New_WP.pdf.*

Reza, Rajjid, "Reducing Migration-induced Misses in an Over-Subscribed Multiprocessor System", ACM, Doctoral Dissertation 2012, pp. 1-105.

List of IBM Patents or Patent Applications Treated as Related; (Appendix P), Filed Feb. 27, 2015; 2 pages.

Muhammad Sohaib Aslam et al., "Cache Mobility", U.S. Appl. No. 14/633,741, filed Feb. 27, 2015.

* cited by examiner

CACHE MOBILITY

BACKGROUND

The present invention relates to management of virtualized workloads, and more specifically, to cache mobility. In a dynamic computing environment (e.g., cloud computing environment), applications being executed may be implemented on resources that are not co-located or may be moved from one physical system to another. For example, when a customer of a cloud computing environment executes an application, the application may be implemented on one cloud resource that accesses information from a database stored on a different cloud resource that is separated by several ethernet switches. As another example, unbeknownst to a cloud customer, an application being executed on one cloud resource may be moved to another (physical) cloud resource for any number of reasons. The reasons may include a crash, upgrade, maintenance, or management decision (e.g., consolidating several users onto one resource rather than spreading them out to increase power usage efficiency).

SUMMARY

According to one embodiment, a method of selecting and migrating relevant data from among data associated with a workload of a virtual machine and stored in source storage cache memory in a dynamic computing environment includes selecting one or more policies, the one or more policies including a size policy defining a default maximum size for the relevant data; selecting the relevant data from among the data based on the one or more policies in a default mode; and migrating the relevant data from the source storage cache memory to target storage cache memory.

According to another embodiment, a system to select and migrate relevant data from among data associated with a workload of a virtual machine and stored in a source storage cache memory in a dynamic computing environment includes a source virtual machine monitor, executed on a source node, configured to select one or more policies, the one or more policies including a size policy defining a default maximum size for the relevant data, and select the relevant data from among the data based on the one or more policies in a default mode; and a target storage cache memory, implemented on a target node, configured to receive and store the relevant data from the source node.

According to yet another embodiment, a computer program product stores instructions for a source virtual machine monitor of a source node which, when processed by a processor, cause the processor to implement a method of selecting relevant data from among data associated with a workload of a virtual machine and stored in source storage cache memory of the source node. The method includes selecting one or more policies, the one or more policies including a size policy defining a default maximum size for the relevant data; and selecting the relevant data from among the data based on the one or more policies in a default mode.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, execution of an application in a dynamic computing environment, such as a cloud computing environment, may include challenges that are not encountered in a fixed environment. In the cloud computing environment, for example, each user accesses a virtual machine that may run on the same physical cloud resource (host or node) as several other users. Users (a user's virtual machine) may be moved from one host to another without their knowledge. When a virtual workload (VW) (an application, operating system, utility, or any other software running within the virtual machine environment) is in use, the virtual workload builds up cache memory associated with the virtual machine (storage cache memory) with frequently or recently accessed data or any data generated by any virtual workload within the virtual machine. Use of the storage cache memory addresses the slowdown that may be experienced when, for example, the storage accessed by an application running within a virtual machine on one host or node actually resides on a physical resource (host or node) that is several ethernet switches away. However, when the virtual machine is moved to a different node or host, the storage cache memory that is used to increase access speed and, thus, speed of execution of the application, is typically left behind. One reason is because the cache may be very large. To be clear, the term storage cache memory is used herein to describe a portion of cache memory that is logically coupled to a virtual machine, but the storage cache memory may physically reside in one or memory devices of the host. Embodiments of the systems and methods detailed herein relate to selecting the most relevant portion of an associated storage cache memory to move or migrate along with the virtual machine. This cache mobility may mitigate any changes in execution speed that may otherwise be experienced following migration of the virtual machine from one host to another.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
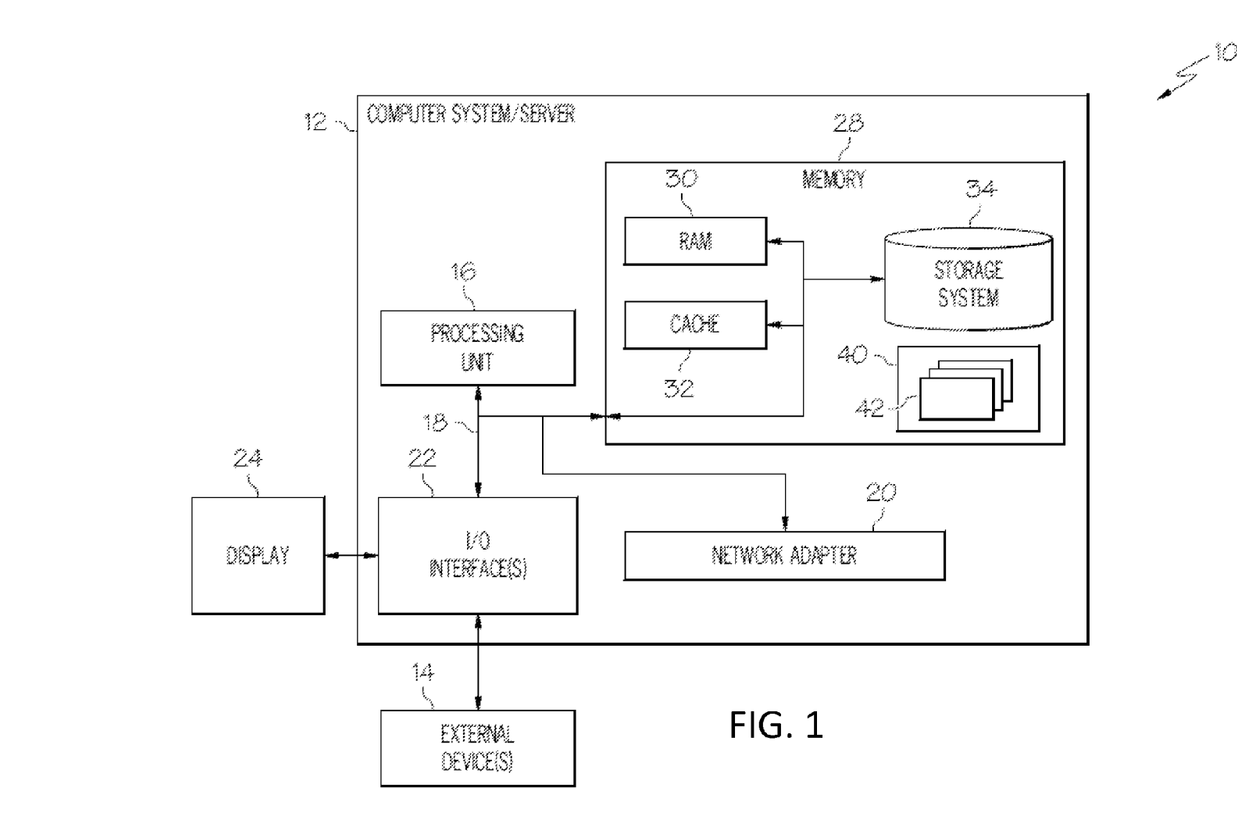
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
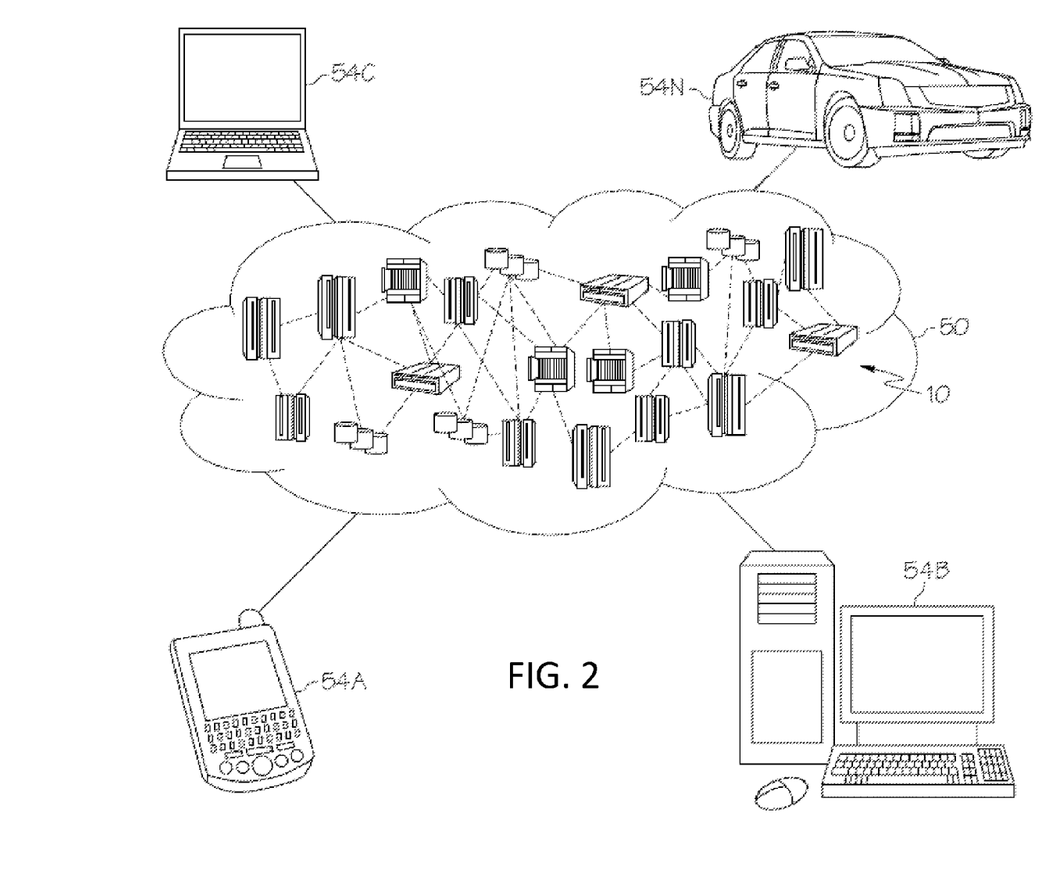
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
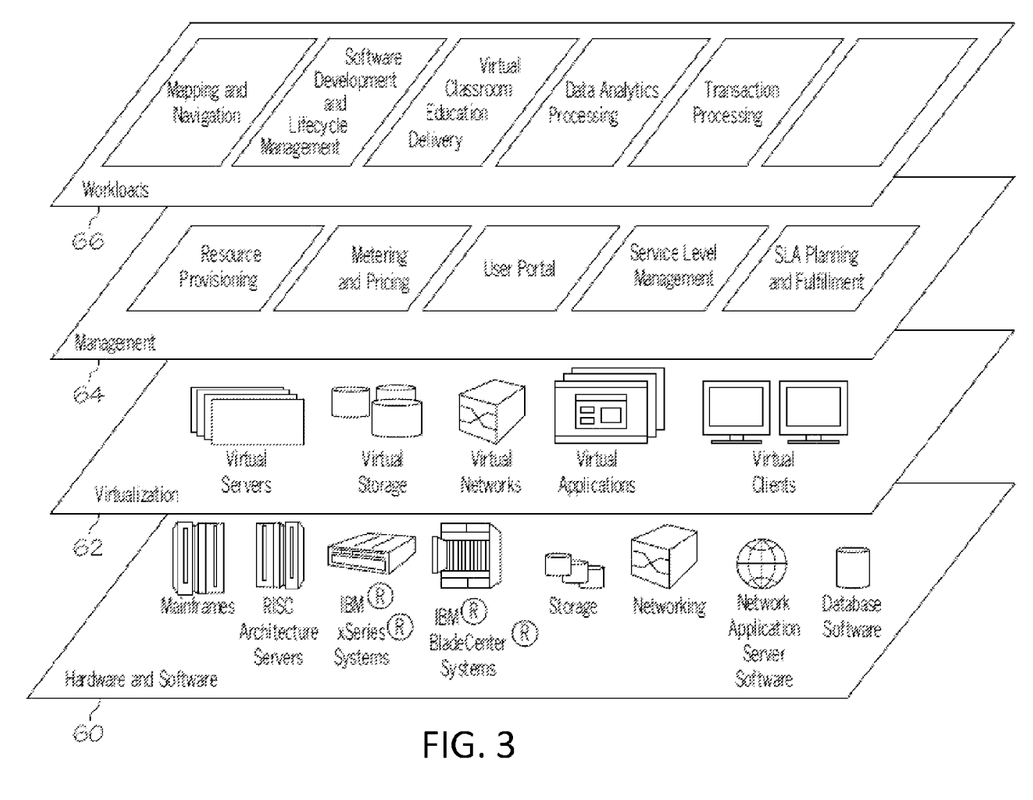
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

Figure 4:
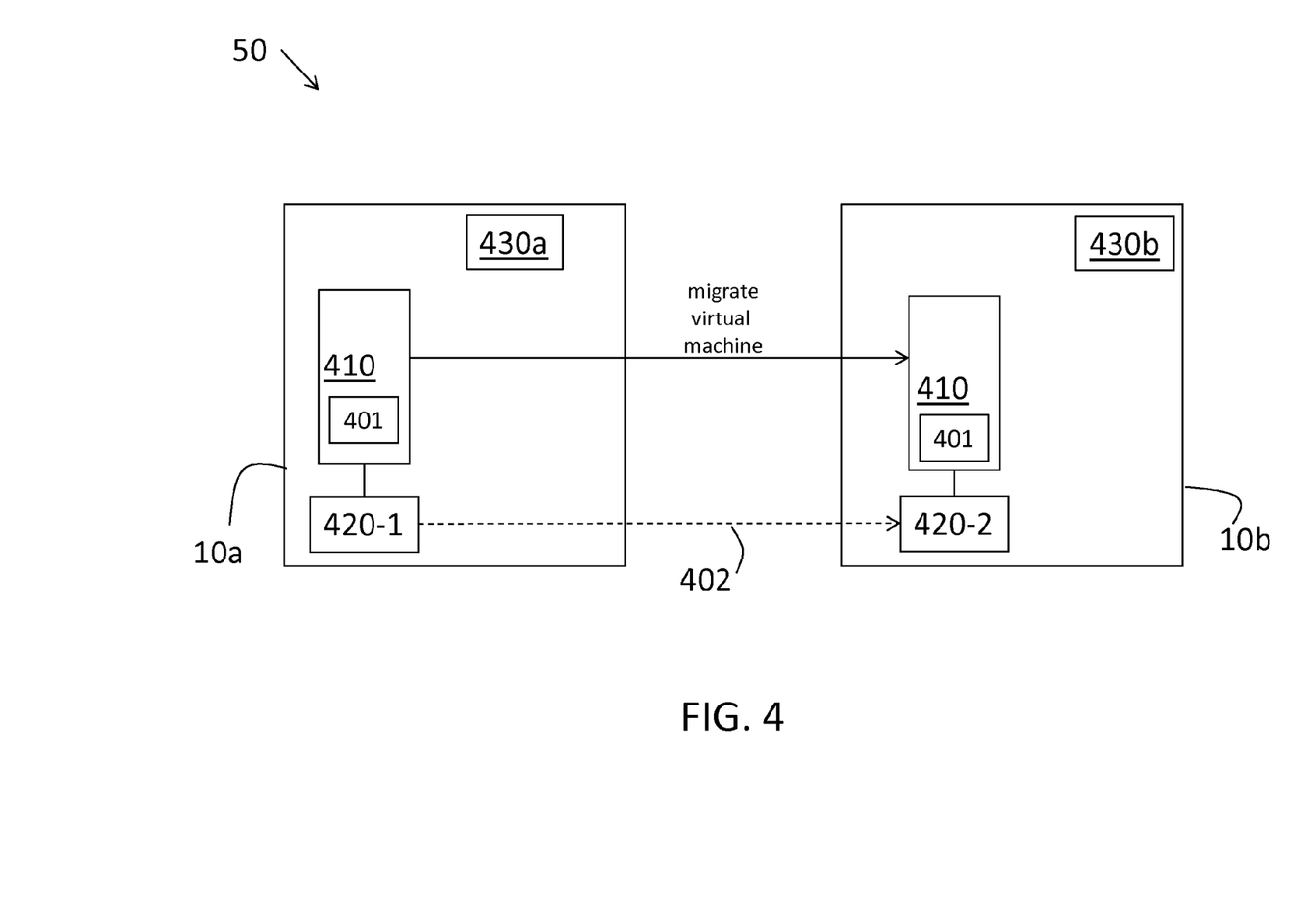
FIG. 4 is a logical block diagram of a virtual machine moving between nodes in a cloud computing environment according to an embodiment.

FIG. 4 is a block diagram of a virtual machine 410 moving between nodes 10 in a cloud computing environment 50 according to an embodiment. As noted above, the virtualization layer 62 facilitates virtualization of various aspects. This virtualization allows a cloud customer to be moved among physical resources (e.g., nodes 10) without realizing any disruption in service. In the exemplary embodiment shown in FIG. 4, a virtual machine 410 running a VW 401 (e.g., applications, operating system) is moved from a source node 10a to a target node 10b. More specifically, the virtual machine 410 is moved from node 10a, where it is logically coupled to storage cache memory 420-1, to node 10b, where it is logically coupled to storage cache memory 420-2. Each node 10a, 10b has a respective virtual machine monitor (VMM) 430a, 430b, also known as a hypervisor, that manages the virtual machine 410 and any other virtual machines (generally 410) that are executed on the source node 10a and target node 10b. The storage cache memory 420-1, 420-2 (cache memory of the respective host or node 10a, 10b that is logically coupled to virtual machine 410) is populated and overwritten over time based on the activity of the VW 401 implemented by the virtual machine 410. As discussed further below, embodiments relate to selecting and moving relevant data 402 from storage cache memory 420-1 to storage cache memory 420-2. According to the embodiments, the VW 401 of the virtual machine 410 can continue to use the relevant data 402 without having to rebuild cache in storage cache memory 420-2 over a period of time during which a cloud customer using the VW 401 on the virtual machine 410 would notice a decrease in performance.

Figure 5:
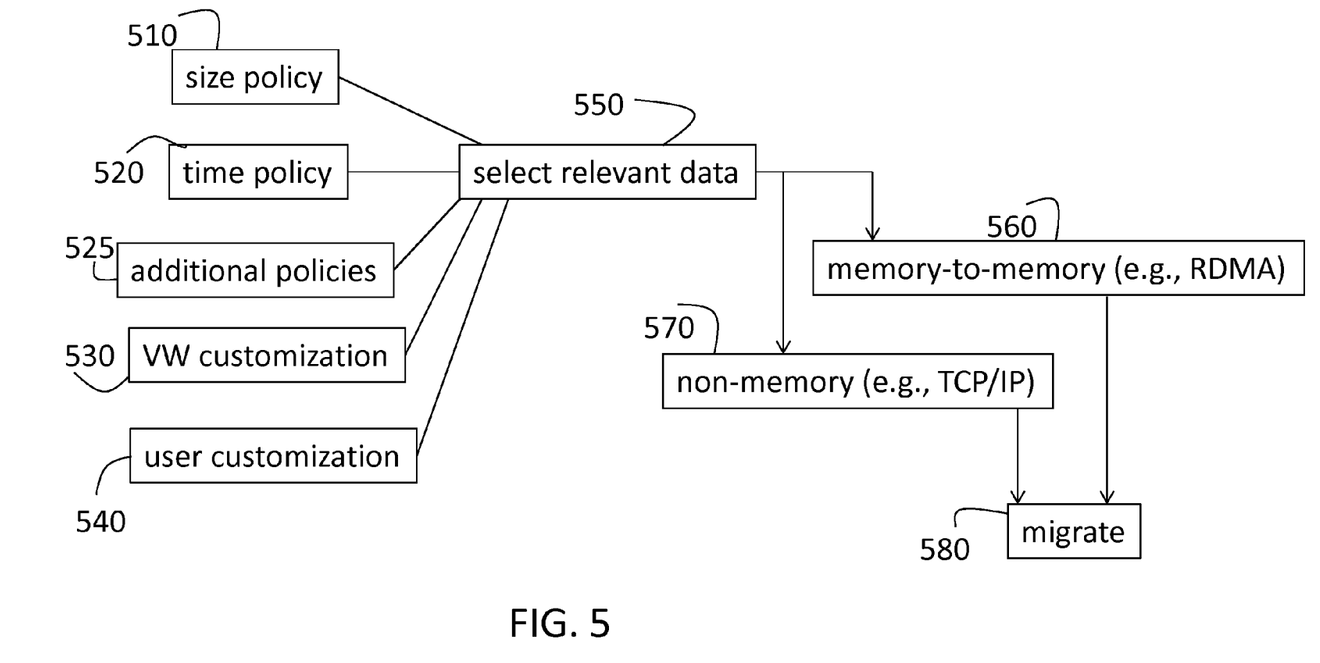
FIG. 5 is a process flow of methods of selecting and moving the relevant data in storage cache memory associated with a migrating virtual machine according to embodiments.

FIG. 5 is a process flow of methods of selecting and moving the relevant data 402 in storage cache memory 420 associated with a migrating virtual machine 410 according to embodiments. The source storage cache memory 420-1 may be on the order of tens of gigabytes (GB). Thus, migration of all the data in the source storage cache memory 420-1 from the source node 10a to the target node 10b may be impractical. Proper selection of the relevant data 402 ensures that necessary information is migrated (from the source storage cache memory 420-1 on a source node 10a to a target storage cache memory 420-2 on a target node 10b) with the virtual machine 410 for faster execution of the VW 401 of the virtual machine 410. The discussion of relevant data 402 is specific to a given VW 401. For example, relevant data 402 for a given VW 401 may be based on frequency of access. That is, data that is accessed more times is more relevant than data that is accessed relatively fewer times. As another example, relevant data 402 for another VW 401 (of another virtual machine 410 being migrated) may be based on the time of access. That is, data that was accessed 30 seconds ago may be more relevant than data that was accessed (even a greater number of times) over 10 minutes ago. Relevancy of data in cache (of the source node 10a) corresponding with other VW 401 of the virtual machine 410 being migrated from the source node 10a to the target node 10b may be based on some combination of frequency and time of access.

The VMM 430a of the source node 10a controls the selection and migration process for the relevant data 402. The VMM 430b of the target node 10b pulls the relevant data 402 (performs the asynchronous transfer). This asynchronous transfer may be done in parallel with the migration of the VW 401 in many cases. The VMM 430a may impose a default size policy 510 and time policy 520 for all virtual machines 410 that are migrated. For example, the relevant data 402 may be limited to 2 GB or any data that has not been accessed within the last 5 minutes may be ineligible for being selected as part of the relevant data 402 set. The VMM 430a may impose additional policies 525, as well. For example, the additional policies 525 may relate to frequency such that data that has not been accessed at least 10 times in the last minute may be ineligible for being selected as relevant data 402. The default size policy 510, time policy 520, and additional policies 525 may be selected based on a type of VW 401 of the virtual machine 410 being migrated, in alternate embodiments. That is, the default may not be exactly the same for every virtual machine 410 but may be the same for a given category of VW 401 (or application or operating system or other software within the VW 401) associated with the virtual machine 410. The category or the way that the VW 401 is grouped to determine the default size policy 510, time policy 520, and additional policies 525 may correspond to the way that data (from a database or the virtual cache memory 420) is accessed. Thus, VW 401 that accesses the same data repeatedly but with long intervals between accesses may have a default time policy 520 that is relatively longer than for a VW 401 in another category, for example. As a result, the source storage cache memory 420-1 associated with the virtual machine 410 that runs the VW 401 would be migrated according to the category of the VW 401.

VW customization (at 530) of the default policies takes into consideration the particular VW 401. Thus, for example, if the VW 401 of a given virtual machine 410 has been developed with specifications regarding the relevant data 402 (which it may not have been), those specifications augment or override the default size policy 510, time policy 520, and additional policies 525, as needed. User customization (at 540) further considers preferences of a particular user of a virtual machine 410 running a VW 401. That is, many instances of the VW 401 may be implemented on various nodes 10 for various customers, but the preferences for the particular user (user customization at 540) whose instance of the VW 401 (the virtual machine 410 running the instance of the VW 401) is being moved from the source node 10a to the target node 10b could additionally or alternately be considered in determining the relevant data 402. Again, the ability for a user to include preferences for the relevant data 402 would have to have been included in the VW 401 development. Selecting relevant data 402 at block 550 is based on the policies and customizations (510, 520, 525, 530, 540).

Once the relevant data 402 is selected, the movement or migration of the relevant data 402 from the source storage cache memory 420-1 to the target storage cache memory 420-2 may be done according to different embodiments. According to one embodiment, at block 560, performing memory-to-memory migration includes the use of remote direct memory access (RDMA), for example. That is, the virtual machine 410 and pointers to the relevant data 402 are migrated, and the VMM 430b of the target node 10b uses the network adapter to directly obtain the relevant data 402 associated with the pointers from the source storage cache memory 420-1. According to another embodiment, at block 570, performing non-memory migration includes using the transmission control protocol/internet protocol (TCP/IP), for example, for end-to-end connectivity. The relevant data 402 is sent as a payload in one or more messages between the source node 10a and the target node 10b. Embodiments of the invention are not limited based on the specific mechanism used to transfer the relevant data 402.

Migrating the relevant data 402 at block 580 is generally done in parallel with the migration of the corresponding virtual machine 410. An exception in when a VW 401 of a particular virtual machine 410 requires a very large set of relevant data 402. That is, the VW customization 530 or user customization 540 may have indicated that a large (e.g., on the order of many GB) set of relevant data 402 should be permitted to migrate from the source storage cache memory 420-1 to the target storage cache memory 420-2. In this case, migrating at block 580 may be done through cache trickling. That is, blocks of the relevant data 402 may be migrated in each transfer (via memory-to-memory transfer or non-memory transfer at block 560 or 570). The blocks of the relevant data 402 may be selected (sub-selected) such that the "hottest" data, based on a criteria provided by the customization at 530 or 540, is migrated first and is available to the VW 401 (of the migrated virtual machine 410) on the target node 10b immediately.

Technical effects and benefits include the capability to migrate a subset of data (relevant data 402) associated with the virtual machine 410 from cache when the virtual machine 410 is migrated from one node 10 to another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of selecting and migrating relevant data from among data associated with a workload of a virtual machine and stored in source storage cache memory in a dynamic computing environment, the method comprising:
    selecting one or more policies, the one or more policies including a size policy defining a default maximum size for the relevant data;
    selecting the relevant data from among the data based on the one or more policies in a default mode; and
    migrating the relevant data from the source storage cache memory to target storage cache memory, wherein the selecting the one or more policies is based on a type of the workload, the types of the workload including an operating system and an application such that two operating systems have a same size policy and two applications have a same size policy.

2. The method according to claim 1, wherein the selecting the one or more policies includes selecting a time policy that defines a default maximum time within which the workload accessed the data selected as the relevant data.

3. The method according to claim 1, wherein the selecting the one or more policies includes selecting a frequency policy that defines a default minimum frequency of access of the data selected as the relevant data.

4. The method according to claim 1, further comprising overriding at least one of the one or more policies in a customization mode.

5. The method according to claim 4, further comprising including customization of the at least one of the one or more policies in the application.

6. The method according to claim 4, further comprising a user of the virtual machine customizing the at least one of the one or more policies.

7. The method according to claim 1, wherein the migrating the relevant data includes sending the relevant data to the target storage cache memory as a payload using transmission control protocol/internet protocol (TCP/IP).

8. The method according to claim 1, wherein the migrating the relevant data includes sending a pointer to the relevant data to a target virtual machine monitor corresponding with the target storage cache memory and the target virtual machine monitor using remote direct memory access (RDMA) to obtain the relevant data.

* * * * *